US012358624B2

(12) United States Patent
Hasselgren et al.

(10) Patent No.: US 12,358,624 B2
(45) Date of Patent: Jul. 15, 2025

(54) SECURE ACCESS AND PRESENTATION OF PASSENGER-SPECIFIC INFORMATION

(71) Applicant: Panasonic Avionics Corporation, Irvine, CA (US)

(72) Inventors: Jonas Hasselgren, Umea (SE); Andreas Hedin, Malmö (SE); Robert Magnusson, Malmö (SE)

(73) Assignee: Panasonic Avionics Corporation, Irvine, CA (US)

( * ) Notice: Subject to any disclaimer, the term of this patent is extended or adjusted under 35 U.S.C. 154(b) by 0 days.

(21) Appl. No.: 17/929,560

(22) Filed: Sep. 2, 2022

(65) Prior Publication Data

US 2024/0076040 A1 Mar. 7, 2024

(51) Int. Cl.
*B64D 11/00* (2006.01)
*H04N 21/214* (2011.01)

(52) U.S. Cl.
CPC .. *B64D 11/00155* (2014.12); *B64D 11/00151* (2014.12); *H04N 21/2146* (2013.01)

(58) Field of Classification Search
CPC ........ B64D 11/00155; B64D 11/00151; H04N 21/2146
See application file for complete search history.

(56) References Cited

U.S. PATENT DOCUMENTS 9,355,396 B1 * 5/2016 Alkasimi ................ H04L 67/12
11,840,160 B1 * 12/2023 Delgado .............. B60N 2/0273
2012/0010911 A1 * 1/2012 Lele ........................ G06Q 10/02
  705/5
2014/0229569 A1 * 8/2014 Zhou ....................... G06Q 10/10
  709/217
2015/0029939 A1 * 1/2015 Fujinami ............... H04L 61/103
  370/328
2015/0189024 A1 * 7/2015 Misra ................... H04M 7/0027
  709/205
2018/0212935 A1 * 7/2018 Iyer ..................... H04L 63/0876
2018/0317071 A1  11/2018 Rabii et al.
(Continued)

FOREIGN PATENT DOCUMENTS

WO 2021079034 A1 4/2021

OTHER PUBLICATIONS

Extended European Search Report from European Patent Application No. 23194323.4 dated Jan. 24, 2024.

*Primary Examiner* — John W Miller
*Assistant Examiner* — Akshay Doshi
(74) *Attorney, Agent, or Firm* — Perkins Coie LLP

(57) ABSTRACT

Embodiments described herein relate to providing authenticated access to passenger-specific information at a seatback device of a vehicle based on connection with personal passenger devices. A method includes obtaining a unique identifier associated with a passenger device that is wirelessly connected with a seatback device located in a vehicle. The method includes determining whether an account data for a passenger corresponding to the seatback device includes an indication of the unique identifier. The method includes automatically causing, based on a determination that the account data includes the indication of the unique identifier associated with the passenger device, at least a portion of the account data to be displayed at the seatback device.

20 Claims, 11 Drawing Sheets

(56) References Cited

U.S. PATENT DOCUMENTS

| | | | |
|---|---|---|---|
| 2019/0143997 A1* | 5/2019 | Crimando | B60W 50/0098 |
| | | | 701/37 |
| 2021/0086726 A1* | 3/2021 | Hassani | B60Q 1/549 |
| 2021/0352432 A1* | 11/2021 | Watson | H04W 12/64 |
| 2023/0118683 A1* | 4/2023 | O'Sullivan | H04L 67/12 |
| | | | 705/14.66 |

* cited by examiner

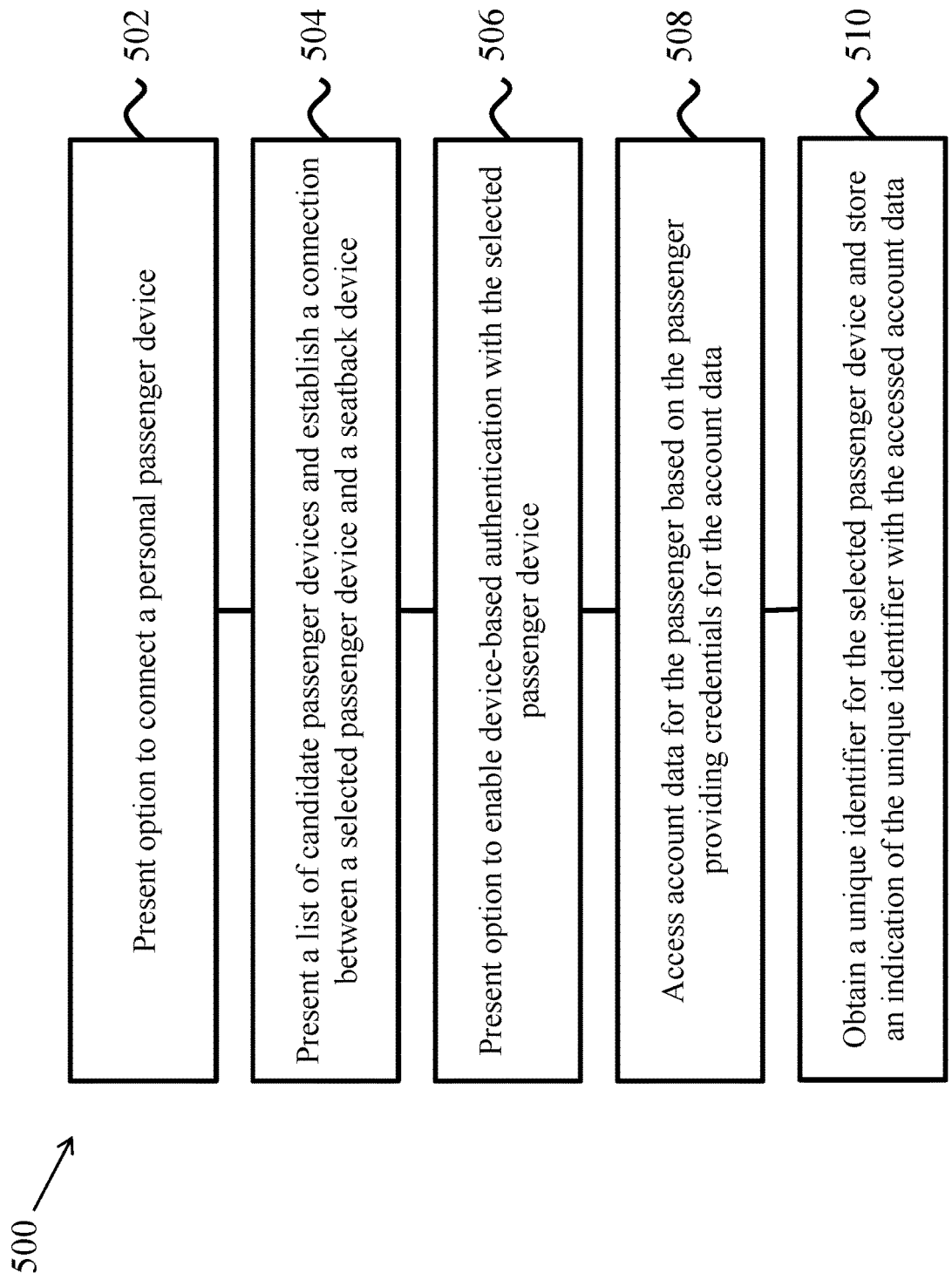

SECURE ACCESS AND PRESENTATION OF PASSENGER-SPECIFIC INFORMATION

TECHNICAL FIELD

This document is related to secure data access in an in-flight entertainment system.

BACKGROUND

Commercial travel has evolved to provide entertainment options to passengers traveling to their destinations. For example, in an airplane or train, entertainment options are provided on monitors located on the back of seats, where passengers can watch movies or television shows via the monitors as they travel to their destinations. Other content specific to certain passengers, such as travel account information and content linked thereto, can be provided via individual monitors for viewing by the passengers. However, there exists a need to verify the identity of passengers located at respective monitors so that passenger-specific data is securely presented. At least these needs are addressed by technical solutions disclosed in this document.

SUMMARY

The present document provides various techniques for providing secure (e.g., authenticated) access to passenger-specific data on an in-vehicle entertainment system. In particular, in some embodiments, passenger devices connected with the in-vehicle entertainment system are used to uniquely identify passengers so that passenger-specific data can be presented at a specific seatback device for a given passenger. For example, a Bluetooth wireless connection between passenger headphones and a specific seatback device is used to verify the identity of the passenger located at the specific seatback device. Accordingly, embodiments disclosed herein provide technical solutions for securely presenting passenger-specific data at a specific seatback device for a passenger.

In one example aspect, a method for providing authenticated access to passenger-specific data on an in-vehicle entertainment system is disclosed. The method includes obtaining a unique identifier associated with a passenger device that is wirelessly connected with a seatback device located in a vehicle. For example, the unique identifier is a media access control (MAC) address for a Bluetooth headphone device associated with a passenger. The method further includes determining whether an account data for a passenger corresponding to the seatback device includes an indication of the unique identifier. For example, the passenger assigned to the seat at which the seatback device is located may or may not have previously registered the Bluetooth headphone device with the passenger's account. The method further includes automatically causing, based on a determination that the account data does include the indication of the unique identifier, at least a portion of the account data to be displayed at the seatback device. For example, the portion of the account data may include a username, an e-mail address, personalized flight or itinerary information and/or the like.

In another example aspect, an entertainment system for a commercial passenger vehicle that includes a plurality of seatback devices is disclosed. The entertainment system includes an authentication interface via which a unique identifier associated with a passenger device that is wirelessly connected with a first seatback device is obtained. The entertainment system further includes an account management module that is configured to perform operations to determine whether an account data for a passenger corresponding to the first seatback device includes an indication of the unique identifier. The entertainment system further includes a personalization platform configured to cause account-specific data to be displayed at the seatback device based on a determination that the account data includes an indication of the unique identifier. For example, the account-specific data includes media content recommendations that are selected based on the account data.

In yet another example aspect, a seatback system or device of a vehicle is disclosed. The seatback system includes a processor configured to execute operations to cause the seatback system to obtain a unique identifier associated with a first passenger device with which the seatback system is wireless connected. The processor is configured to execute operations to further cause the seatback system to determine whether account data for a passenger corresponding to the seatback system includes an indication of the unique identifier. The processor is configured to execute operations to further cause the seatback system to automatically present, based on a determination that the account data includes the indication of the unique identifier associated with the first passenger device, account-specific data for display to the passenger.

In yet another aspect, a computer readable medium is disclosed. The computer readable medium stores processor-executable program code that, upon execution by one or more processors, causes implementation of a method described in the present document.

These, and other aspects are disclosed throughout the present document.

BRIEF DESCRIPTION OF THE DRAWINGS

FIG. 5 is a flowchart for an example method of enabling authenticated access to passenger-specific data on an in-vehicle entertainment system.

DETAILED DESCRIPTION

1. Introduction

Figure 1:
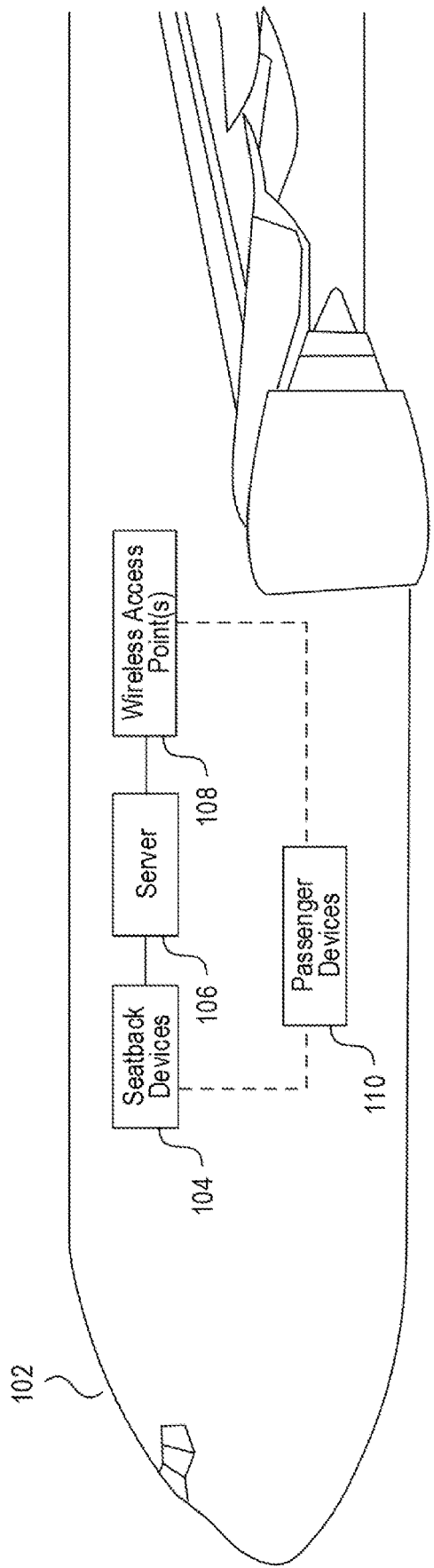
FIG. 1 shows an exemplary passenger vehicle that includes an in-flight entertainment and communication (IFEC) installation.

Among the many advancements in aircraft technology, improvements in passenger experience have received much attention. Air travel typically involves journeys over extended distances that at the very least take several hours to complete, so airlines provide onboard in-flight entertainment (IFE) and communications (IFEC) systems that offer a wide variety of multimedia content for passenger consumption. For example, IFEC systems may offer recently released movies and television shows such as news programs, situation and stand-up comedies, documentaries, and so on for passenger viewing. As another example, IFEC systems may offer audio-only programming, video-only content, video games, or the like.

The specific installation may vary depending on service class, though in general, each passenger seat is equipped with a seatback device that includes a display device, an audio output modality, an input modality, and a terminal unit. The terminal unit may generate video and audio signals, receive inputs from the input modality, and execute pre-programmed instructions in response thereto. The display device is typically a liquid crystal display (LCD) screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected, in some examples. In some examples, the audio output modality enables wireless connection with passenger devices, such as personal audio playback devices (e.g., headphones, earphones, earbuds, speakers, etc.). Inputs to the terminal unit may be provided via a separate multi-function remote controller or by via a combination touch display. Although the terminal unit and display device were separate components in earlier IFEC implementations, more recently, these components and more may be integrated into a single smart monitor or seatback device.

To further enhance passenger experience, useful and individually specific information may need to be provided to passengers via IFEC systems. For example, passengers may have a need to view specific information related to a flight or travel itinerary, personal communications (e.g., e-mails, instant messages), personally-curated content recommendations, and/or the like. Presenting such information to passengers requires secure verification and authentication of passenger identity at a specific system (e.g., a seatback device) at which the individually or personally specific information is presented.

Personal privacy and security would be compromised if, for example, a travel itinerary for a first passenger is presented to a second passenger. As another example, personal recommendations that are made based on an incorrect identity for a passenger may result in the passenger spending more time traversing a content catalog and may detract from the passenger's experience. As yet another example, cybersecurity is significantly compromised if a passenger can access, view, and even transmit messages at a given seatback device in place of another passenger.

Thus, technical problems arise in scenarios in which passenger identity is unknown or mistaken. For example, on a commercial aircraft, passenger identity may be mistaken if passengers sit in seats other than the seats to which the passengers are assigned. In this example, manifest information that describes seat assignments and locations for passengers in the commercial aircraft can be unreliable, and presentation of passenger-specific information at seatback devices based on the manifest information can result in security threats.

Another scenario in which passenger identity is unknown occurs at a travel hub, such as an airport or a train station, where a passenger may wish to view previously-accessed content (e.g., a movie, a TV show, music) while waiting for travel. Without the passenger's identity, it is difficult to provide content that the passenger desires to view.

Embodiments disclosed herein enable authentication of passenger identity and secure data access to passenger-specific information and data. Thus, embodiments disclosed herein address at least the technical challenges identified above based on linking unique identifiers for passenger devices to unique passenger identities. As such, a passenger can be uniquely identified based on the passenger's usage of a passenger device, such as a headphone device, and information specific to the passenger can then be securely provided.

In some embodiments, unique identifiers for passenger devices are stored in passenger account data. Passenger account data may refer to airline accounts, such as frequent flyer accounts or memberships, social media accounts, retailer membership accounts, and/or other accounts uniquely tied to a passenger identity. In examples implemented for aircraft that include seatback devices, airline account data for passengers on the aircraft is loaded onto the aircraft (e.g., stored on an on-board server or computing system) such that a unique identifier for the passenger device can be stored in or with the on-board version airline account data for the passenger. Upon the aircraft landing or being in communication with a ground server, the on-board version of the account data with the unique identifier can be provided to the ground server to update a cloud version of the account data, which may be used in the future to identify the passenger on other aircraft, flights, locations, and/or the like. In some examples, account data for passengers on an aircraft is accessed, received, or obtained while the aircraft is in flight based on a connection between systems onboard the aircraft and a ground server (e.g., via satellite communication paths, via plane-to-plane communication, via cellular communication).

As such, device-based identification or authentication can be enabled and initiated in instances when connection with a ground server for managing account data is unreliable or unavailable. Generally, in some embodiments, account data with unique identifiers for personal passenger devices used for authentication of passenger identity can be distributed and used on different vehicles, travel hubs, locations, and/or the like such that a passenger can securely access passenger-specific information in more settings.

2. Exemplary Computing System and IFEC Deployments

According to some example embodiments, secure access to passenger-specific information is provided to passengers in an aircraft via seatback devices. FIG. 1 shows an exemplary overview of an IFE system installed in an airplane 102. The IFE system includes a plurality of seatback devices 104.

In some embodiments, the seatback devices 104 include an in-device terminal or computing unit. In some embodiments, the seatback devices 104 are communicably coupled to computing units (e.g., computers) that may be located in a seat below one or more seatback devices 104. For example, one or more seatback devices 104 located in a row in the airplane 102 may be communicable coupled to one computing unit located below a seat in the row. In another example, each seatback device 104 may be communicably coupled to a respective computing unit that is located in the seat where the seatback device 104 is located.

Each of the plurality of seatback devices 104 (or computing units to which the seatback devices 104 are coupled) may include an ethernet connector which allows the plurality of seatback devices 104 to be communicably coupled to a server 106 via, for example, an Ethernet switch. In some embodiments, the server 106 stores data used to enable and provide device-based authenticated access to passenger-specific information. For example, the server 106 stores local or on-board versions of cloud account data that may or may not include unique identifiers of passenger devices. In some embodiments, the server 106 includes one or more processing units configured to implement example operations disclosed herein to authenticate identities of passengers located at the seatback devices 104 and to cause secure presentation (e.g., display and/or audio playback) of passenger-specific information at the seatback devices 104.

In some embodiments, the server 106 is communicably coupled (e.g., via Ethernet switch) to one or more wireless access points 108. Thus, in such embodiments, passengers may use passenger devices 110 (e.g., computers, laptops, mobile phones, tablets) to connect to the one or more wireless access points 108 so that the passenger devices 110 can communicate with the plurality of seatback devices 104 via the server 106. In some embodiments, a passenger may operate one or more passenger devices 110 (e.g., smartphones, laptops, tablets, communication devices, entertainment devices) while on-board the vehicle, and the passenger devices 110 of a passenger is connected to a seatback device 104 and/or the server 106 of the IFE system.

In some embodiments, each of the plurality of seatback devices 104 is configured such that a passenger device 110 can directly communicate with a seatback device 104 (or a computing unit to which the seatback device 104 is coupled). For example, each seatback device 104 is configured for Bluetooth or Bluetooth Low Energy (BLE) communication with passenger devices 110. Accordingly, a seatback device 104 is configured to detect nearby candidate passenger devices, establish a connection or pairing with a passenger device 110, and transmit/receive data via the connection or pairing with the passenger device 110. In some examples, a seatback device 104 is configured for direct communication with passenger devices 110 via other means, such as a near-field communication (NFC) device via which a passenger device 110 directly communicates with the seatback device 104.

In some embodiments, connection between a known passenger device and a seatback device 104 is used to verify, authenticate, and/or determine an identity of a passenger at the seatback device 104. For example, a passenger device 110 may have a unique identifier that is stored in or with account data for a passenger. Upon connection of the passenger device 110 and a given seatback device 104 and with identification of the unique identifier, the passenger can be identified at the given seatback device 104. In some embodiments, the passenger devices 110 includes personal audio playback devices, such as headphone devices, used by passengers to receive audio content. In some examples, passengers receive audio content via the passenger devices 110 in conjunction with video or image content being provided via the seatback devices 104 (e.g., such as during a movie).

While FIG. 1 illustrates an example of an aircraft, embodiments disclosed herein for authenticated access to passenger-specific information are applicable to other vehicles. For example, embodiments disclosed herein enable passengers on a train to securely access passenger-specific information at respective and individual stations (e.g., seatback devices, tablets, kiosks) on the train. Further, embodiments disclosed herein are applicable to systems at travel hubs. For example, embodiments disclosed herein enable travelers at an airport lounge to securely access passenger-specific information (e.g., a flight itinerary, account payment methods, a movie that was partially watched by a traveler on a previous flight) via a lounge device or system based on establishing a connection between the passenger's headphones with the lounge device or system.

Figure 2:
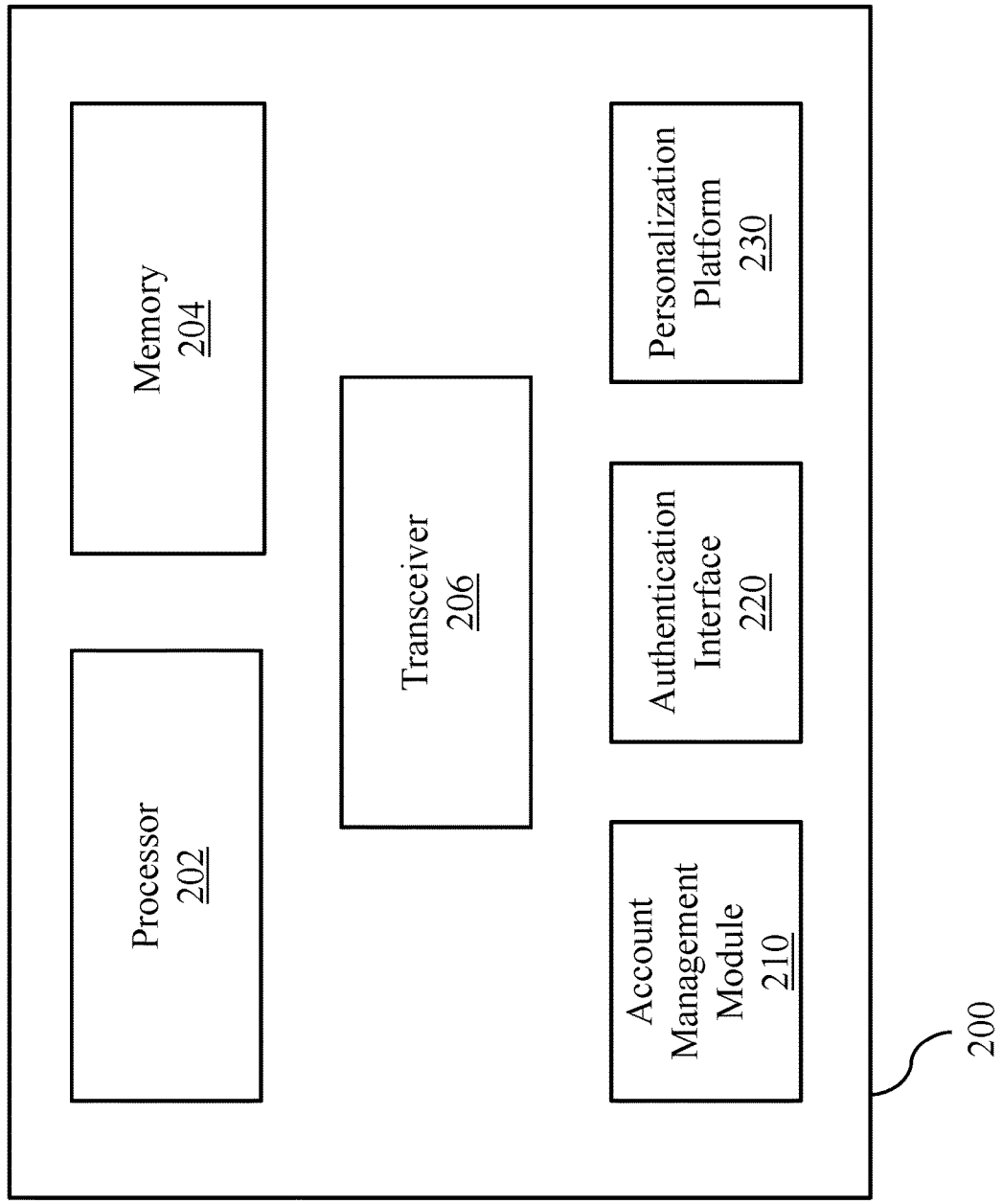
FIG. 2 is a block diagram of a device on which embodiments described herein may be implemented.

FIG. 2 provides a diagram illustrating an example computing entity or device 200 that implements various embodiments described herein. For example, in some embodiments, the device 200 is configured to perform operations that relate to enabling and providing authenticated access to passenger-specific information via a specific seatback device based on a connection with a passenger's personal device (e.g., headphones). In some embodiments, the device 200 is embodied by an entertainment system (IFEC system), an in-vehicle server (e.g., server 106), an individual seatback device, one or more groups of seatback devices (e.g., multiple seatback devices sharing computational load and resources), and/or the like.

In FIG. 2, the device 200 includes at least one processor 202 and a memory 204 having instructions stored thereupon. The memory 204 may store instructions to be executed by the processor 202. In other embodiments, additional, fewer, and/or different elements may be used to configure the device 200. The memory 204 is an electronic holding place or storage for information or instructions so that the information or instructions can be accessed by the processor 202. The memory 204 can include, but is not limited to, any type of random access memory (RAM), any type of read only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 202 configure the device 200 to perform the example operations described in this patent document.

The instructions executed by the processor 202 may be carried out by a special purpose computer, logic circuits, or hardware circuits. The processor 202 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 202 can perform the operations called for by that instruction. The processor 202 operably couples with the memory 204 and transceiver 206 to receive, to send, and to process information and to control the operations of the device 200. The processor 202 may retrieve a set of instructions from a permanent memory device such as a ROM device and copy the instructions in an executable form to a temporary memory device that is generally some form of RAM. In some implementations, the device 200 can include a plurality of processors that use the same or a different processing technology.

The transceiver 206 transmits and receives information or data to another device (e.g., a passenger device 110, a ground server, other servers, satellites, or the like). For example, the transceiver 206 is configured for Bluetooth communication with a passenger device 110. The transceiver 206 may be comprised of a transmitter and a receiver; in some embodiments, the device 200 comprises a transmitter and a receiver that are separate from another but functionally form a transceiver.

In some embodiments, the device 200 includes input/output interfaces (not explicitly shown). For example, when the device 200 is embodied by a seatback device 104, the device 200 includes input/output interfaces for providing audio and video content and for receiving user inputs. The I/O interfaces enable data to be provided to the device 200 as input and enable the device 200 to provide data as output. In some embodiments, the I/O interfaces may enable user input to be obtained and received by the device 200 (e.g., via a touch-screen display, via buttons or switches) and may enable the device 200 to display information, including passenger-specific information such as itinerary information, content recommendations, merchandise recommendations, and/or the like. In some embodiments, devices including touch-screen displays, buttons, controllers, audio speakers, or the like are connected to the device 200 via I/O interfaces.

As shown in FIG. 2, the device 200 includes an account management module 210, an authentication interface 220, and a personalization platform 230 to implement various embodiments described herein. In some embodiments, the account management module 210, the authentication interface 220, and the personalization platform 230 cooperate to implement example operations of methods disclosed herein to provide authenticated access to passenger-specific information via specific seatback devices. While certain operations may be described herein with respect to one of the account management module 210, the authentication interface 220, or the personalization platform 230, it will be understood that the operations and functionality described in this document may be implemented and performed by any one or combination thereof according to the embodiment.

In some embodiments, each of the account management module 210, the authentication interface 220, and the personalization platform 230 are implemented as software modules that are executable by the device 200. In some embodiments, each of the account management module 210, the authentication interface 220, and the personalization platform 230 are implemented as hardware components included in or in communication with the device 200.

The account management module 210 is configured to store, manage, modify or update, and/or the like account data for one or passengers. In some embodiments, the account management module 210 locally stores account data for passengers of a vehicle before a flight or travel of the vehicle. For example, account data may be centrally managed by managing entity (e.g., a vehicle operating entity, an airline, a content provider, and/or the like) at a ground server, and the account management module 210 receives the account data from the ground server. With the local storage of the account data by the account management module 210, the account data can be used (e.g., accessed, modified, referenced) while the vehicle is in travel and may not be in communication with the ground server.

In some embodiments, the account management module 210 synchronizes the locally stored version of the account data, which may have been updated or modified during the travel of the vehicle, with the ground server. For example, account data for a passenger is updated in-flight to include a unique identifier of a passenger device to be used as an in-flight authentication measure, and the account management module 210 synchronizes with the ground server to cause the unique identifier to be included in the version of the account data stored at the ground server.

In some examples, the account management module 210 is configured to obtain the passenger account data while the vehicle is in travel (e.g., in flight) based on a maintained connection between the account management module 210 and a ground server (e.g., via satellite communication, via plane-to-plane communication, via cellular communication).

In some embodiments, the account management module 210 references account data to determine whether a particular unique identifier is stored with or within account data for a particular passenger. Accordingly, via the account management module 210, a detected passenger device 110 with the particular unique identifier can be used to confirm the identity of the particular passenger. In some embodiments, the account management module 210 determines whether a particular unique identifier is stored with or within account data for any passenger on the vehicle. Accordingly, via the account management module 210, a detected passenger device 110 with the particular unique identifier can be used to determine an identity of a given passenger.

In some embodiments, the account management module 210 stores and references manifest information that indicates an expected mapping of passengers to seatback devices 104 in the vehicle. For example, before a flight of an aircraft, passengers are assigned to specific seats, and connection of passenger devices is used to authenticate the identity of passengers at the specific seats. Thus, a determination that a passenger is located at a seat to which the passenger is not assigned (e.g., according to the manifest information) can be made based on a connection of the passenger's personal device with the seatback device at the seat. In some embodiments, the account management module 210 references manifest information to identify specific account data, and the account management module 210 determines whether the specific account data includes a particular unique identifier for a passenger device. The manifest information describes an in-vehicle location (e.g., a seat) for each passenger of the vehicle, and seatback devices are associated with various in-vehicle locations. Accordingly, a passenger can correspond to a seatback device based on the manifest information describing, for the passenger, a particular in-vehicle location with which the seatback device is associated.

In some embodiments, the account management module 210 performs operations with account data based on cooperating with the authentication interface 220, such as by receiving the unique identifier of a detected passenger device from the authentication interface 220.

In some embodiments, the authentication interface 220 is configured to obtain unique identifiers for personal passenger devices in the vehicle. In particular, unique identifiers for passenger devices 110 connected (e.g., wireless) with a seatback device 104 and/or the server 106 (e.g., via a wireless access point 108) are obtained via the authentication interface 220. In some embodiments, the authentication interface 220 is configured to obtain unique identifiers for a passenger device 110, such as a media access control (MAC)

address, a serial number, a globally unique identifier (GUID), a universally unique identifier (UIUD), a cryptographic hash value (e.g., a hash of the aforementioned example identifiers), an incremental index number, and/or the like. In some embodiments, the authentication interface 220 is configured to generate a unique identifier for a passenger device 110. For example, the authentication interface 220 generates a unique identifier for a passenger device 110 that is based on an incrementing counter, that is a cryptographic hash representation of an MAC address of the device, that includes an internet protocol (IP) address, and/or the like.

Thus, the authentication interface 220 automatically obtains a unique identifier for a passenger device 110 responsive to the passenger device 110 being connected to a seatback device, and the unique identifier obtained by the authentication interface 220 is provided to the account management module 210 for authentication and verification of passenger identity at the seatback device. As discussed, based on a determination that account data for the passenger includes the unique identifier for the passenger device 110, the identity of the passenger can be authenticated.

In some embodiments, the determination is provided to the personalization platform 230 to cause passenger-specific information to be provided. That is, in some embodiments, the authentication or verification of passenger identity is indicated (e.g., from the account management module 210) to the personalization platform 230, responsive to which the personalization platform causes presentation of passenger-specific information at the seatback device. In some embodiments, an indication that a failure to authenticate or verify passenger identity is indicated (e.g., from the account management module 210) to the personalization platform 230 to prevent passenger-specific information from being presented at the seatback device.

In some embodiments, the personalization platform 230 is configured to cause presentation of at least a portion of the account data of the passenger at a seatback device. For example, the personalization platform 230 causes presentation of a passenger name, account number, account identifier (e.g., an e-mail address), and/or the like. As another example, flight or travel itinerary information is stored with account data, and the personalization platform 230 causes presentation of the flight or travel itinerary information. For example, the personalization platform 230 causes display of a map that shows multiple travel segments (e.g., connecting flights) for the passenger.

In some embodiments, the personalization platform 230 is configured to enable management of account data. For example, via user input at a seatback device, a passenger may modify portions of account data, such as mailing addresses, shipping addresses, name, birthdate, payment methods, and/or the like.

In some embodiments, the personalization platform 230 is configured to cause presentation of account or passenger-specific information to a passenger via a seatback device. Such information includes information or content curated specifically for the passenger. For example, content and product recommendations are determined and provided to a passenger by the personalization platform 230. As another example, playback progress for content is managed and used during content presentation by the personalization platform 230. Accordingly, if a passenger watches a movie up to a certain time point, the movie can be presented starting from the certain time point by the personalization platform 230. As yet another example, the passenger-specific information includes travel recommendation based on flight or travel itinerary information for the passenger. For example, one or more hotels near a final destination of the passenger can be recommended to the passenger via the personalization platform 230.

In the identified examples above, the personalization platform 230 causes presentation of account data and account-based (or passenger-specific) data to a passenger via a specific seatback device to which the passenger has connected a personal device (e.g., headphones). As such, embodiments disclosed herein provide technical solutions. Personalized content is provided based on device-based authentication, and failure to pass the device-based authentication may prevent such personalized content from being insecurely shared with other passengers.

Figure 3:
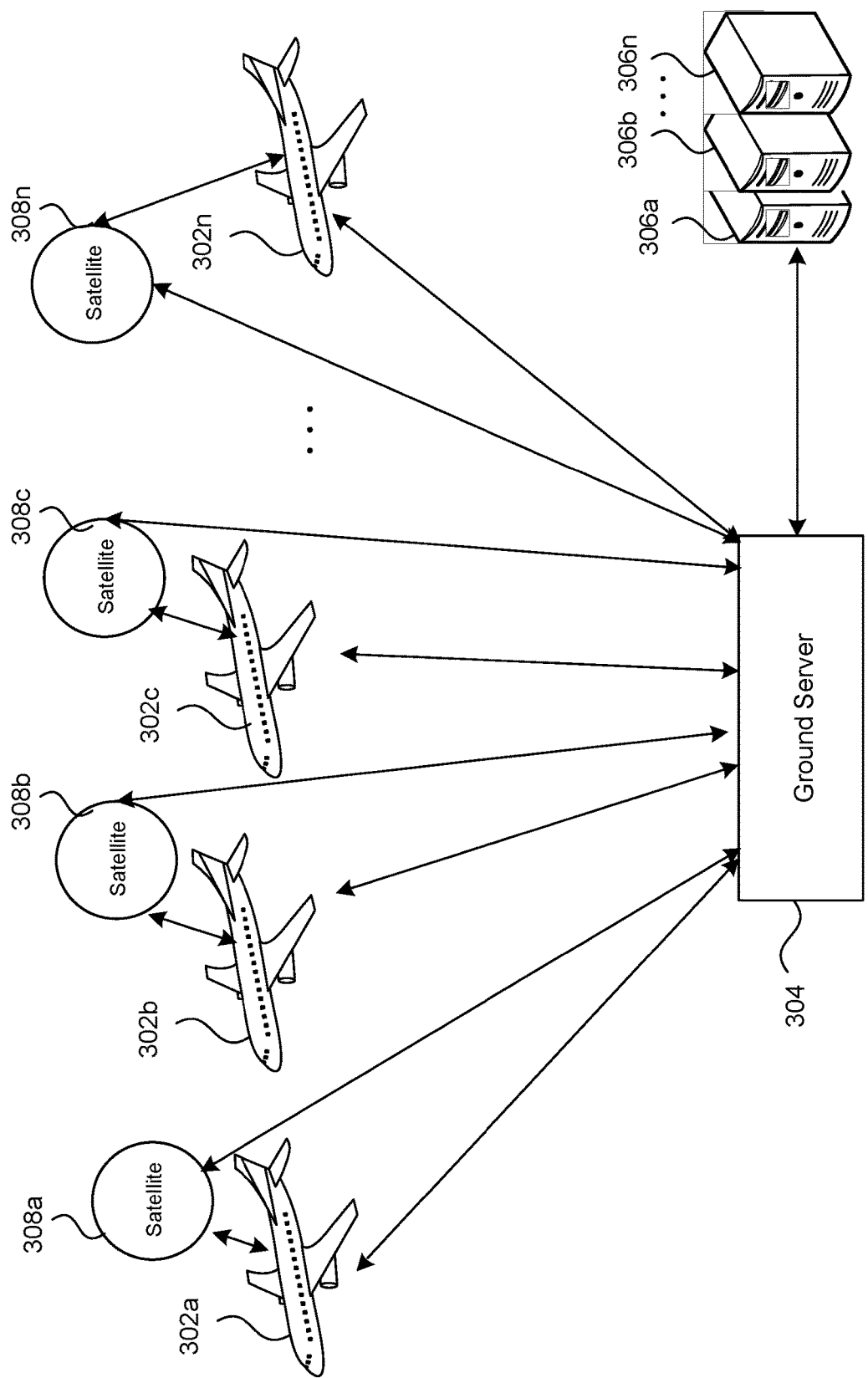
FIG. 3 shows a vehicle network for authenticated access and presentation of passenger-specific data in passenger vehicles.

FIG. 3 shows an exemplary system for data gathering, processing, and displaying. In particular, FIG. 3 shows a communication network in which passenger account data and unique identifiers for passenger devices may be collected and communicated to, from, and among vehicles. For example, in accordance with various embodiments described herein, an IFEC system on-board an airplane may obtain a unique identifier of a passenger device and may receive a user input requesting that the unique identifier be stored or linked with account data so that the passenger can authenticate the passenger's identity using the passenger device on future travels. According to FIG. 3, the unique identifier obtained at one airplane may be shared with other airplanes and with a ground server 304. In this way, passenger devices may be assigned with universally unique identifiers, and two passenger devices on two different airplanes are not assigned with the same identifier, in some examples.

A ground server 304 may be configured to communicate with vehicles 302a, 302b, 302n either via a direct communication link or through a satellite connection using satellites 308a, 308b, 308c, . . . 308n. In some embodiments, databases 306a, 306b, . . . 306n may include a database storing account data for a population of passengers and travelers. Different databases may store different account data for a given passenger. For example, a passenger may be associated with an airline account, a retailer account, a content subscription, and/or the like, which may each be stored by a different data 306a, 306b, . . . 306n. The ground server 304 may communicate with each of the databases 306a, 306b, . . . 306n to provide account data to the vehicles 302a, 302b, . . . , 302n.

The account data provided by the ground server 304 may be used by a server on a vehicle 302 to authenticate passenger identities during pre-flight, in-flight, and end-flight stages, for example, and to enable future device-based authentication. In some embodiments, the data gathering, processing and displaying system depicted in FIG. 3 may include equipment that provides wireless communication connectivity between the airplane equipment and ground based server via equipment such as a Wi-Fi access point at the gate, or via a cellular communication equipment such as a cell phone tower that may be available to the airplane at the airport or near gate area. In some examples, the Wi-Fi and cellular connectivity may also be available to some airplanes during flight; for example, some airplanes may maintain connectivity with the ground server 304 while in flight such that data is obtained from the ground server 304 at any time while the airplanes are in flight.

Figure 4:
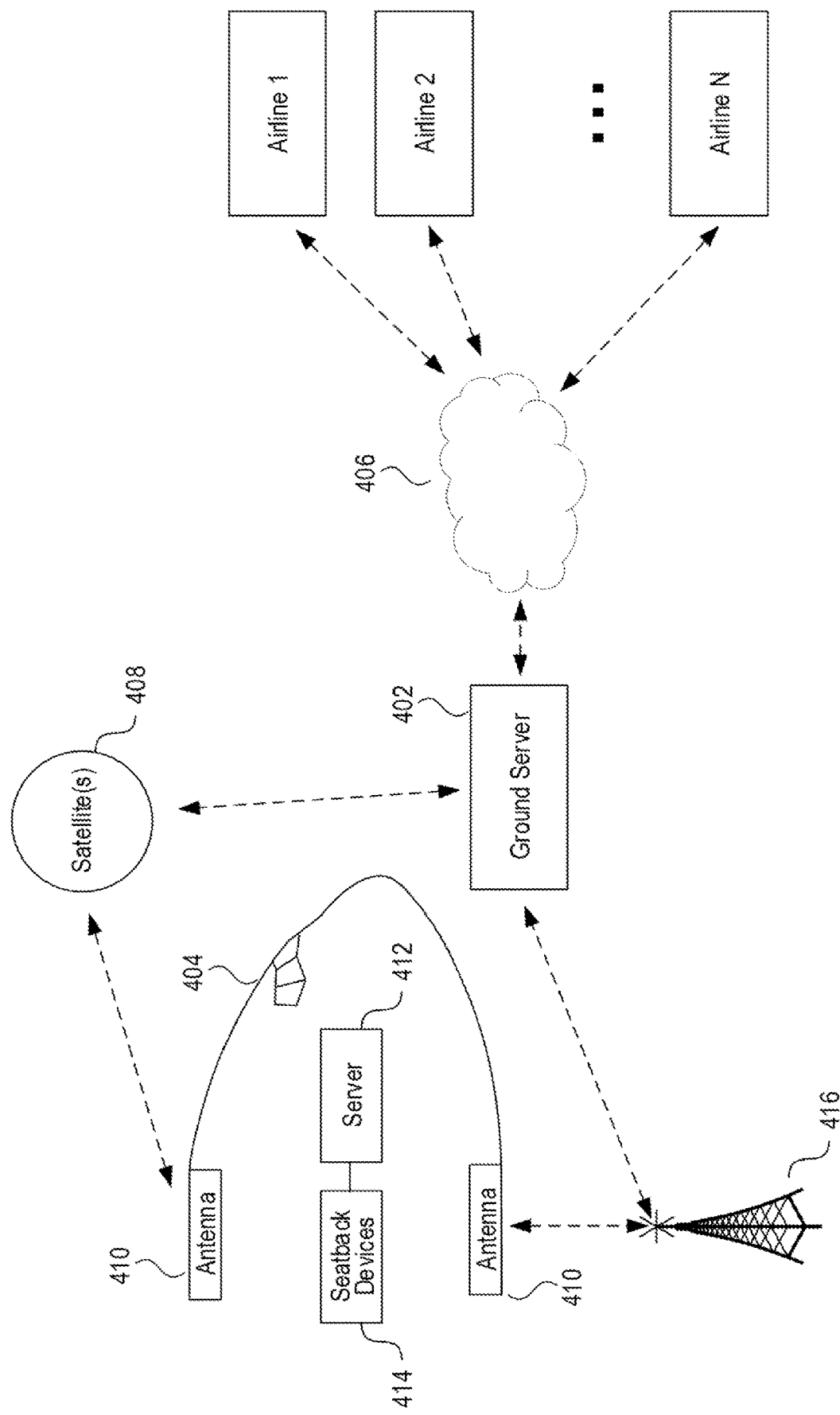
FIG. 4 shows an example of a network architecture for authenticated access and presentation of passenger-specific data in a passenger vehicle.

FIG. 4 shows another configuration of a system in which a ground server 402 may use information from multiple airlines (Airline 1, Airline 2 . . . Airline N) to provide account data to an aircraft 404. For example, as illustrated, the ground server 402 communicates with multiple airlines to retrieve account data for passengers of the aircraft 404. Thus, in some embodiments, account data for various passengers may be collected and stored at the ground server 402, possibly via communication through the internet 406, in some embodiments.

The ground server 402 may communicate the information via a satellite dish with one or more satellites 408, and the information is in turn received in the aircraft 404 via antenna 410 by an onboard server 412. The onboard server 412 may implement various embodiments described herein, to provide device-based authentication and secure presentation of passenger-specific information at specific seatback devices 414 onboard the aircraft 404. Alternatively, or in addition, the ground server 402 may communicate the information to the onboard server 412 through a terrestrial connection such as through cellular communication via a cellular network to an antenna 410 onboard the airplane that is configured to cellular reception. In some embodiments, the connectivity between the ground server 402 and airplane equipment may be based on a local area wireless network (e.g., a Wi-Fi access point) or a cellular communication network (e.g., cell tower 416) which may be available to the IFEC for communication while during a flight or when parked at an airport terminal, near the gate area.

As illustrated in FIG. 4, the onboard server 412 may be in communication with one or more seatback devices 414. The onboard server 412 may communicate display data to the seatback devices 414 responsive to determining or verifying an identity of a passenger located at each seatback device 414, and the display data includes passenger-specific information. The onboard server 412 may be connected with the seatback devices 414 via wireless connection or via wired connections.

3. Onboard Server Deployment Examples

An IFEC installation may include an onboard server that may be implemented in the form of one or more hardware platforms that include one or more processors, one or more computer memories and network interface for digital data communications. For example, the onboard server may embody the device 200. The onboard server may be configured to provide various instructions and content to the seatback displays, the wireless access points, Bluetooth transceivers. The onboard sensor may also be configured to communicate with a ground server or another server across the internet or a computing cloud for exchanging information related to account data for passengers, unique identifiers for passenger devices, and so on. The onboard server may perform such communication in real-time (e.g., using the example satellite communication paths depicted in FIGS. 3 and 4) or offline such as communicating with the ground sever at the beginning and/or end of a travel segment.

Various technical solutions described herein may be implemented by the onboard server. For example, the onboard server may obtain a unique identifier for a passenger device connected to a seatback device and may determine whether account data for a passenger corresponding to the seatback device (e.g., according to manifest information) includes the unique identifier. Based on the account data including the unique identifier, the onboard server determines passenger-specific information and causes the passenger-specific information to be presented at the seatback device.

As another example, the onboard server determines that account data for a passenger corresponding to a seatback device does not include any unique identifier for any passenger devices. The onboard server receives a request from the seatback device based on user input that includes a unique identifier for a passenger device to include the account data for the passenger. The onboard server updates the account data and synchronizes with a ground server such that the passenger device can be used by the passenger for authentication on a future flight.

4. Ground Server Embodiment Examples

Similar to the server systems onboard the aircraft described above, the ground server is understood to be a standalone computer system, or multiple standalone computer systems with general purpose data processors, memory, secondary storage, and/or a network interface device for connecting to each other. The computer systems may have an operating system installed thereon, along with the server applications that implement the various components of the system for sensor data collection and processing according to the embodiments disclosed herein. The ground server may access manifest information for a vehicle and use the manifest information to retrieve account data for each passenger from one or more databases. For example, the ground server identifies one or more airline accounts, one or more retailer accounts, one or more content subscriptions, and/or the like for a passenger and retrieves relevant account data.

The ground server may also synchronize account data with an onboard server. For example, account data stored by an onboard server of a vehicle may be modified, and the different versions of account data between the ground server and the onboard server are synchronized. In some embodiments, the ground server and the onboard server synchronize account data after the airplane lands and establishes a connection with the ground server.

5. Example Embodiments and Solutions

As described, embodiments described herein provide methods, systems, computer-readable media, and the like for providing authenticated access to passenger-specific information for a passenger at a specific seatback device based on a connection of a known passenger device to the specific seatback device. In particular, knowledge of passenger devices associated with passengers is managed based on unique identifiers of the passenger devices being stored or linked with account data (e.g., airline accounts or memberships) for the passengers.

Figure 7:
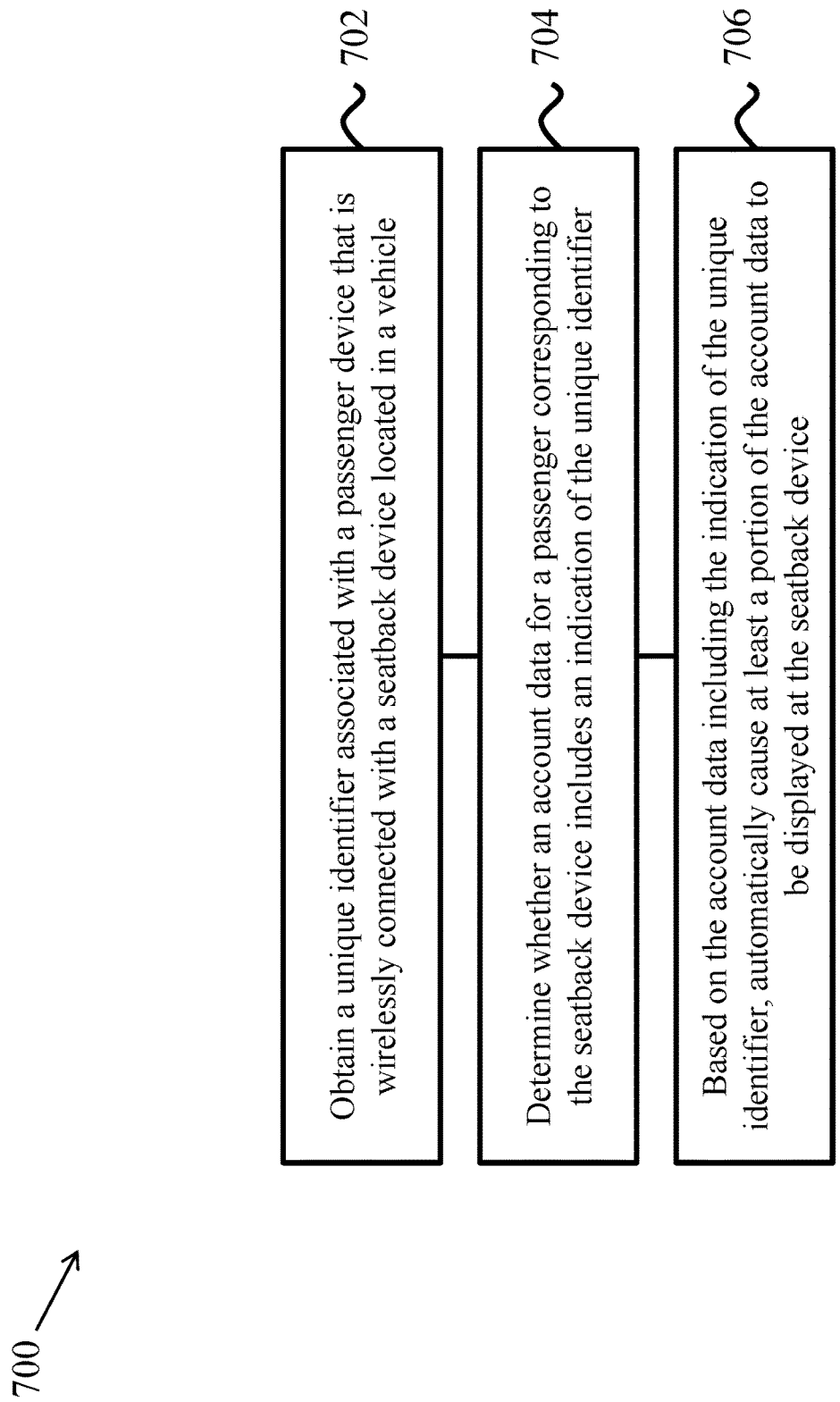
FIG. 7 is a flowchart for an example method of providing authenticated access to passenger-specific data on an in-vehicle entertainment system.

FIGS. 5 and 7 show flowcharts of example methods relating to authenticated access to passenger-specific information at a seatback device based on a connection with a passenger device. In particular, FIG. 5 shows a flowchart of an example method for enabling, initiating, or registering the device-based authenticated access to passenger-specific information, such as by obtaining knowledge of passenger devices for passengers. FIG. 7 shows a flowchart of an example method for providing the authenticated access to passenger-specific information based on a connection with a known passenger device.

In some embodiments, the example methods of FIGS. 5 and 7 respectively may be performed responsive to vehicle travel being initiated. For example, the examples methods of FIGS. 5 and 7 may be preceded by operations that include synchronizing account data for passengers of the airplane to an on-board server of the airplane from a ground server and receiving an indication that a flight of the airplane has opened. In examples, the account data or passenger data includes a passenger identifier, an assigned location within the airplane (e.g., a seat number), and an indication of a unique identifier for a passenger device (e.g., a headphone device) if available. In some examples, the indication of the unique identifier for the passenger device is a cryptographic hash representation of a MAC address of the passenger device and one or more other properties or values associated with the passenger device and/or the passenger.

Accordingly, in some embodiments, the method of FIG. 5 for enabling device-based authenticated access to passenger-specific information by obtaining knowledge of passenger devices may be performed in response to a determination that, for a given seatback device of the airplane, account data for the passenger assigned to the given seatback device does not include any indication of a unique identifier of the passenger device. Meanwhile, the method of FIG. 7 for providing authenticated access to passenger-specific information based on a connection with a known passenger device may be performed in response to a determination that, for a given seatback device of the airplane, account data for the passenger assigned to the given seatback device does include an indication of a unique identifier of a passenger device. In some embodiments, the methods of FIG. 5 and FIG. 7 may be performed at various points in time and repeatedly for a passenger to register and use multiple passenger devices as authentication measures.

Turning now to FIG. 5, an example method 500 may be implemented and/or performed by an IFEC system on-board a vehicle (e.g., the server 106 in FIG. 1) or by one or more seatback devices in the vehicle (e.g., seatback devices 104 in FIG. 1).

At an operation 502 of the method 500, an option to pair a passenger device, such as a headphone device, with a seatback device is presented at the seatback device to a passenger located at the seatback device. For example, the passenger may desire to pair the headphone device to listen to audio content with video or image content that is presented on the seatback device.

At an operation 504 of the method 500, a list of candidate passenger devices to pair with is presented at the seatback device. The list of candidate passenger devices may include devices detected by the seatback device for Bluetooth connection.

Figure 6A:
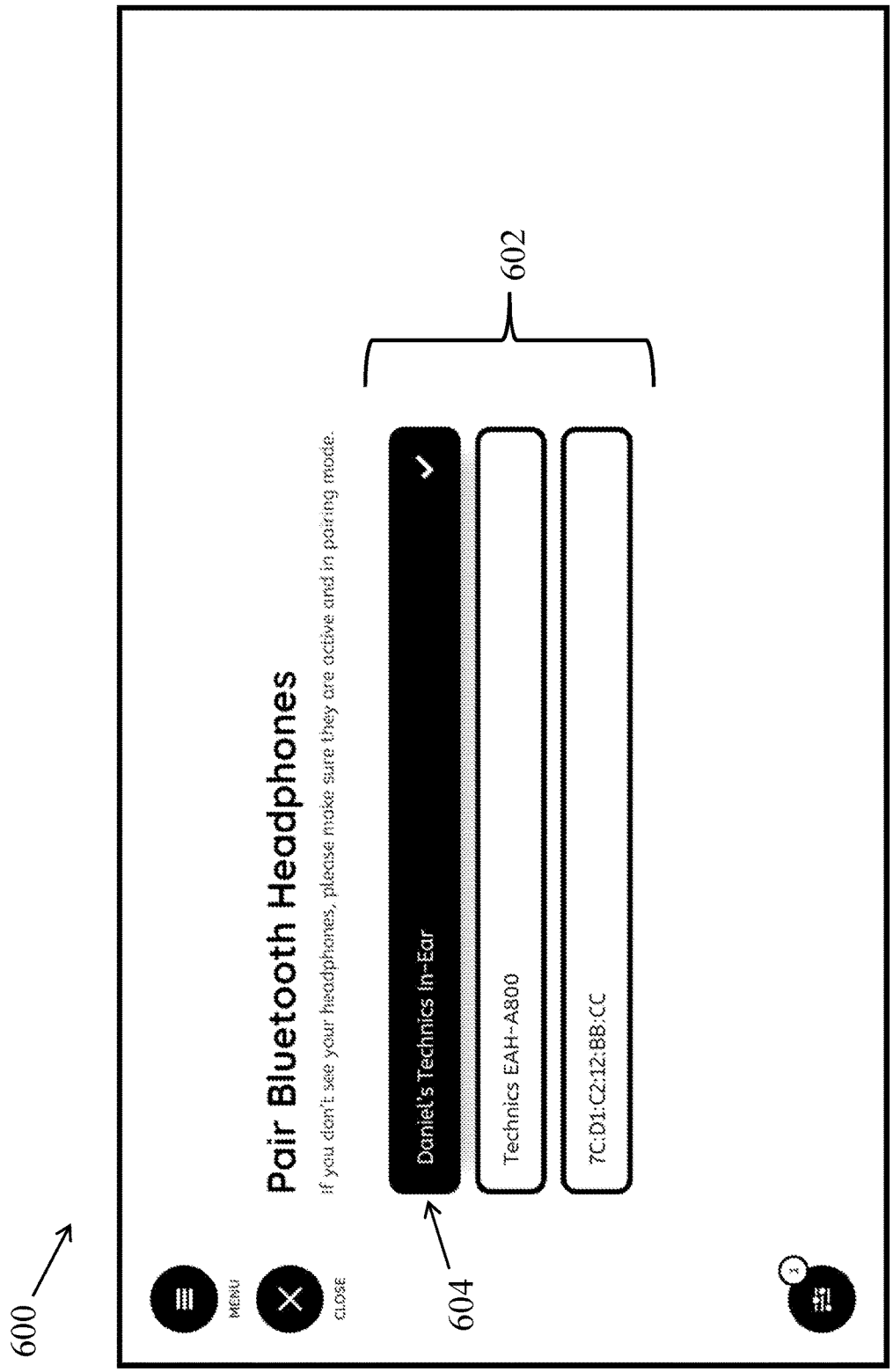
FIG. 6A shows an example of a user interface presented to a passenger to enable authenticated access to passenger-specific data on an in-vehicle entertainment system.

FIG. 6A shows an example user interface 600 that may be presented at a seatback device with operation 504. For example, a list 602 of candidate passenger devices is displayed, and user selection of a candidate passenger device from the list is enabled. In the illustrated example, a selected passenger device 604 is indicated. Operation 504 includes establishing a connection between the selected passenger device 604 and the seatback device.

Figure 6B:
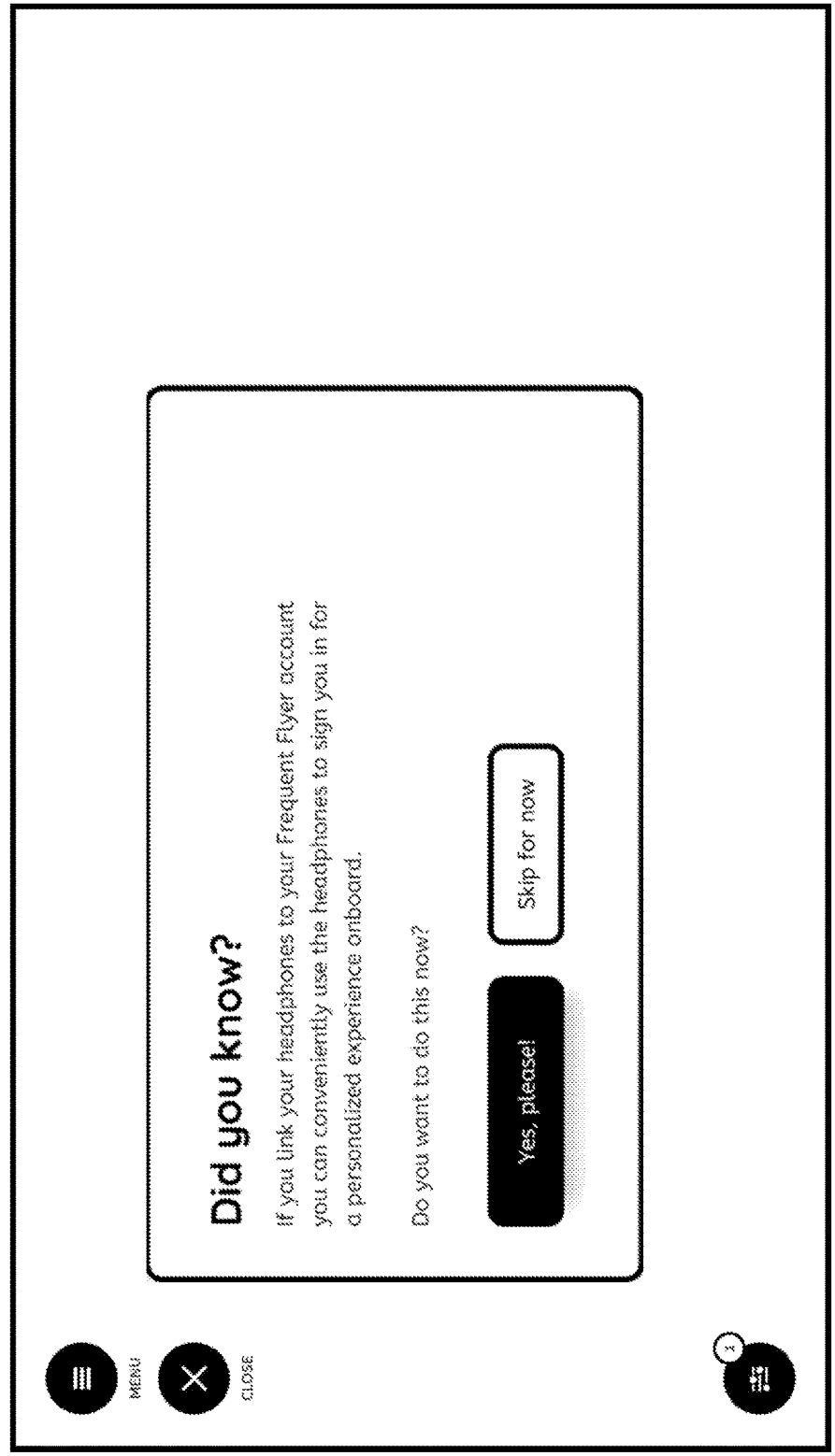
FIG. 6B shows another example of a user interface presented to a passenger to enable authenticated access to passenger-specific data on an in-vehicle entertainment system.

At an operation 506 of the method 500, an option to enable device-based authentication with the selected passenger device is presented. FIG. 6B shows an example user interface 610 that presents the option to enable device-based authentication with the selected passenger device. As illustrated, the passenger is indicated that the selected passenger device can be stored with, linked to, associated with, and/or the like account data for the passenger.

At an operation 508 of the method 500, account data for the passenger is accessed based on the passenger providing user input accepting the presented option for device-based authentication. In examples, the account data is accessed based on the passenger providing sign-in credentials for the account data, such as an e-mail address and a password or other verification means. In doing so, the identity of the passenger is verified before the passenger device can be associated with the account data for the passenger. At this point, the passenger can be presented with account or passenger-specific information based on the sign-in to the account data. For example, personalized content and product recommendations may be presented.

At an operation 510 of the method 500, a unique identifier for the selected passenger device is obtained, and an indication thereof is stored in the account data for the passenger. For example, the unique identifier is a MAC address of the selected passenger device. The account data is the local version of the account data stored on the on-board server of the airplane, in some examples. If conditions for synchronizing account data with the ground server are met (e.g., the airplane has landed), the local version of the account data with the indication of the unique identifier is synchronized with the ground server. For example, the on-board server transmits the account data with the indication of the unique identifier to the ground server and causes a version of the account data stored at the ground server to be updated to include the indication of the unique identifier. In other examples, communication with the ground server may be available (e.g., the airplane has not taken off yet, the airplane is in the air and uses satellite paths shown in FIGS. 3 and 4) and the unique identifier is stored directly in a ground server version of the account data.

Turning now to FIG. 7, an example method 700 may be implemented and/or performed by an IFEC system on-board a vehicle (e.g., the server 106 in FIG. 1) or by one or more seatback devices in the vehicle (e.g., seatback devices 104 in FIG. 1). As discussed, method 700 relates to providing authenticated access to passenger-specific information based on connection with a known passenger device. For example, method 700 may be performed at some point after method 500, or when an indication of a unique identifier for a passenger device is stored with account data for a passenger. In some examples, method 700 may be performed for a different seatback device, a different vehicle, and/or the like where account data for the passenger is accessible.

At an operation 702 of the method 700, a unique identifier associated with a passenger device that is wirelessly connected with a seatback device located in a vehicle. The passenger device may be connected with the seatback device based on an option to use device-based authenticated access is presented and based on a selection of a passenger device from a presented list of candidate passenger devices.

Figure 8A:
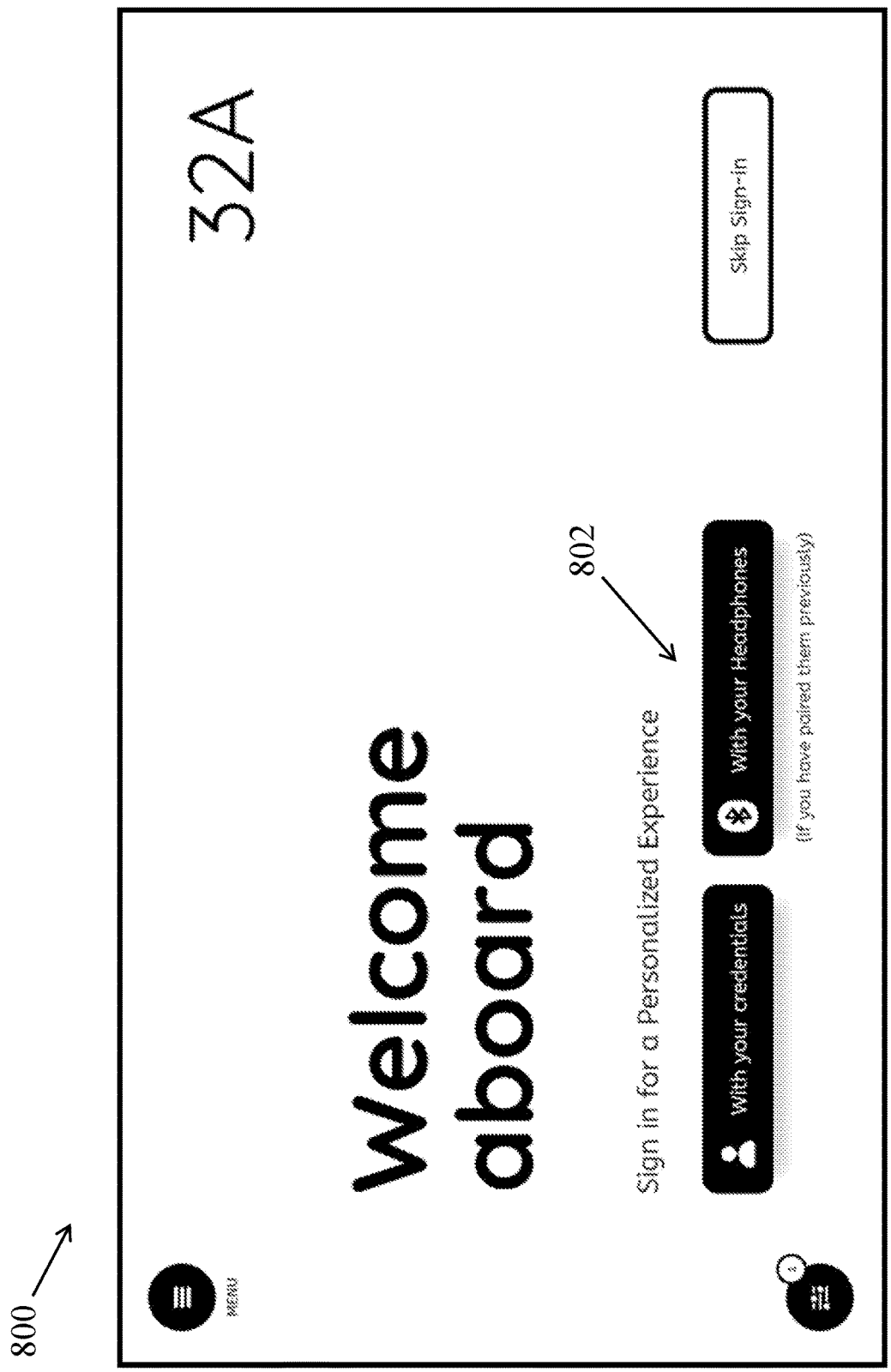
FIG. 8A shows an example of a user interface via which a passenger provides authentication for accessing passenger-specific data on an in-vehicle entertainment system.

For example, FIG. 8A shows an example user interface 800 at which a passenger is presented with an option 802 to use device-based authenticated access for passenger-specific information (e.g., "a personalized experience"). In some embodiments, the user interface 800 presents the option 802 based on a detected level of activity of the passenger. For example, wireless (e.g., Bluetooth) connection resources in an airplane may be limited, and the IFE system may only support a number of wireless connections with personal passenger devices throughout the airplane. Thus, the option 802 to connect a personal passenger device and use device-based authenticated access is only presented to select passengers, in some embodiments. In some embodiments, passengers are selected based on a level of activity or interaction with the seatback device and/or other controls at the seat. For example, a frequency of user interactions with the seatback device is measured and compared against a threshold. If the frequency satisfies the threshold, the option 802 is presented. In some embodiments, the threshold is based on a number of existing wireless connections in the airplane.

Figure 8B:
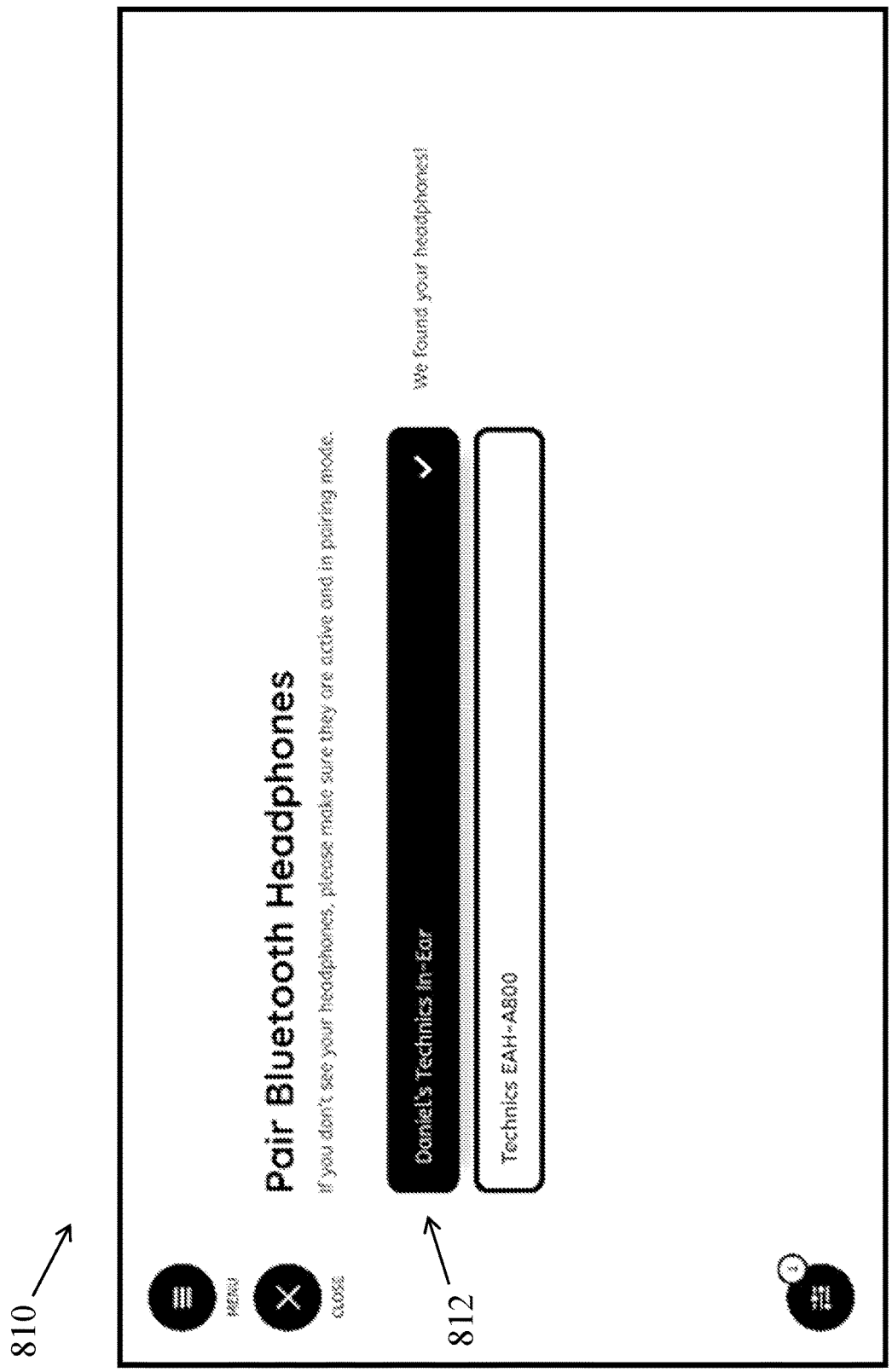
FIG. 8B shows another example of a user interface via which a passenger provides authentication for accessing passenger-specific data on an in-vehicle entertainment system.

FIG. 8B shows another user interface 810 that may be presented in response to a user selection of the option 802 in user interface 800. In the user interface 810, a list of candidate passenger devices is presented, and a passenger can select his or her personal passenger device 812 to use for authentication and for listening to audio content, for example. As shown in the illustrated example, the passenger device expected to be associated with the passenger can be indicated (e.g., "we found your headphones!"). In particular, manifest information is used to identify account data for the passenger that is assigned to the seatback device, and the expected passenger device can be indicated if an indication of the unique identifier for the expected passenger device is included in the identified account data. With connection of a selected passenger device with the seatback device (whether the selected passenger device is the expected device or not), a unique identifier for the selected passenger device is obtained at operation 702.

At operation 704, it is determined whether an account data for the passenger corresponding to the seatback device includes an indication of the unique identifier obtained for the passenger device.

At operation 706, based on a determination that the account data includes an indication of the unique identifier, at least a portion of the account data is automatically caused to be displayed at the seatback device. For example, a name of the passenger in a welcome message, a flight itinerary, an e-mail address, and/or the like can be displayed.

Figure 8C:
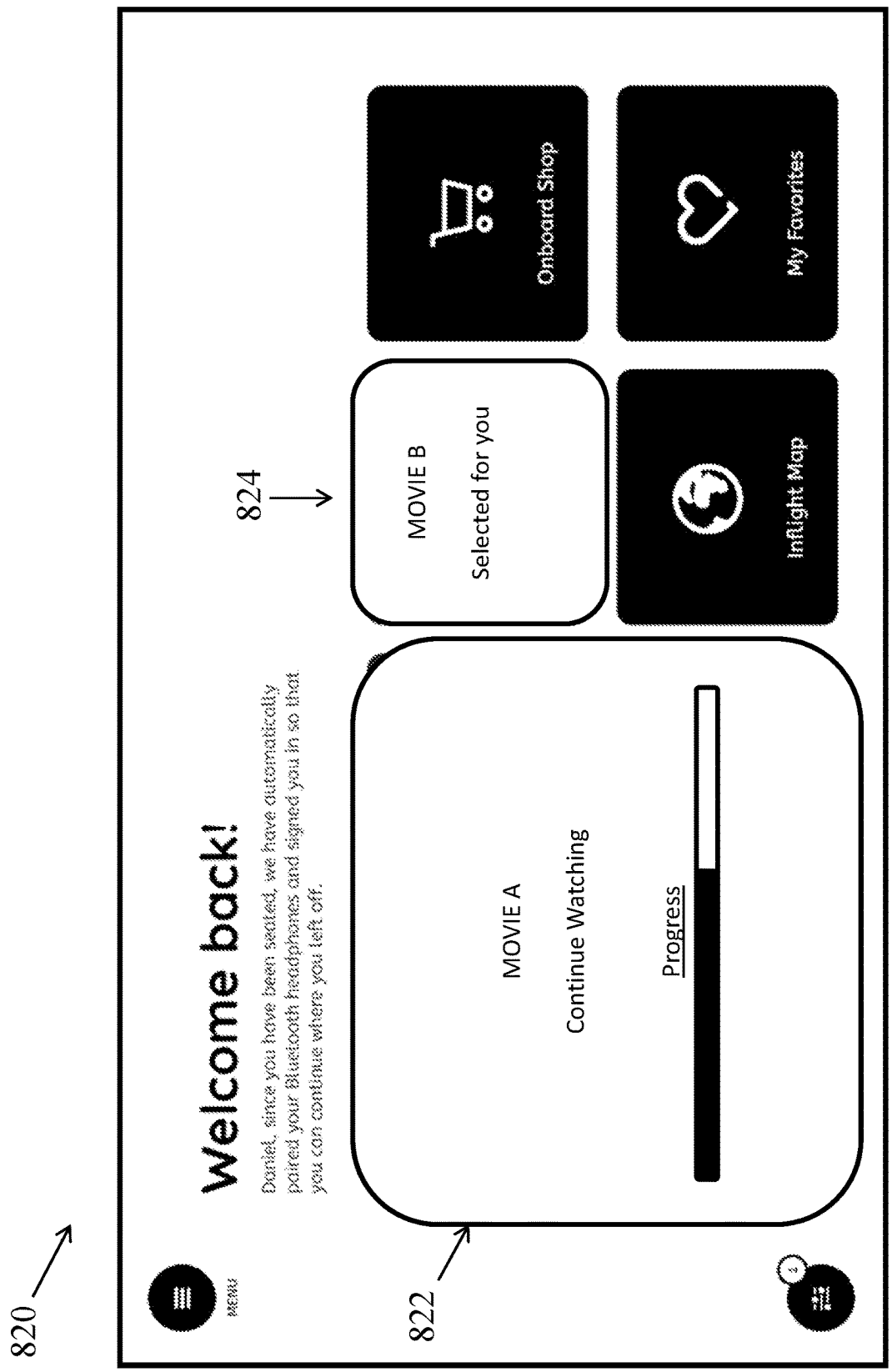
FIG. 8C shows an example of a user interface presented to a passenger that includes passenger-specific data based on an authentication of the passenger.

In some examples, passenger-specific or account-specific information can be displayed. FIG. 8C shows an example user interface 820 in which passenger-specific information is displayed. For example, media content 822 that was previously presented to the passenger (e.g., at home, on a previous flight, in an airport or travel hub, on a mobile device of the passenger) is available to be presented. In some examples, recommendations 824 for media based on a content history indicated in account data for the passenger and/or based on content preferences included in account data for the passenger can be presented. In some examples, product or merchandise recommendations based on a purchase history indicated in account data for the passenger and/or based on product preferences included in account data for the passenger can be presented.

In some embodiments, if a determination that the account data for the passenger corresponding to the seatback device does not include the unique identifier is made, the passenger is presented with an option to register the passenger device as an authentication measure. For example, the example method 500 of FIG. 5 may be performed if the account data does not include the unique identifier.

In some embodiments, if a determination that the account data does not include the unique identifier is made, account data for the passengers in the vehicle is parsed to determine which passenger, if any, is associated with the passenger device. If a passenger is found to be associated with the passenger device (e.g., suggesting that the passenger is located at a seat to which the passenger is not assigned), the correct account data can be identified, and personalized content based on the correct account data is provided at the seatback device.

In some embodiments, a level of activity of the passenger is measured or detected to determine whether to maintain a connection with the personal passenger device. As discussed, in some examples, wireless connection resources in an airplane may be limited, and the IFE system may only support a number of wireless connections with personal passenger devices throughout the airplane. A level of activity of the passenger is measured based on a frequency of user interactions with the seatback device, whether audio and/or video content is being provided, and/or the like. If the level of activity of the passenger fails to satisfy a threshold (e.g., no content is being played, no user input in a certain time period after a prompt), then the personal passenger device may be automatically disconnected from the seatback device so that other passengers can use the limited wireless connection resources to connect their personal passenger devices.

Passengers, if disconnected based on a lack of activity, can re-connect their passenger devices and be automatically signed into the seatback devices. Thus, in some examples, a passenger can connect and re-connect multiple times with a seatback device and be provided with passenger-specific information each time based on the personal passenger device being associated with the passenger.

This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus. Depending on the type of a commercial passenger vehicle different constraints areas may be used during implementations.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The various embodiments introduced herein can be implemented by, for example, programmable circuitry (e.g., one or more microprocessors, programmed with software and/or firmware), or entirely in special-purpose hardwired circuitry (e.g., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc. In some embodiments, the methods may be stored in the form of computer-executable instructions that are stored on a computer-readable medium. Alternatively, or in addition, cloud-based computing resources may be used for implementing the embodiments.

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method for providing authenticated access to passenger-specific data on an in-vehicle entertainment system, comprising:
   obtaining, via an authentication interface, a first unique identifier associated with a first passenger device that is located within a commercial passenger airplane and wirelessly paired with a seatback device of a plurality of seatback devices corresponding to a plurality of seat locations within the commercial passenger airplane;
   referencing, by an account management module, manifest information that respectively maps a plurality of passengers to the plurality of seat locations within the commercial passenger airplane, to determine whether a user operating the first passenger device is a passenger that was assigned to a particular seat location of the seatback device based on the manifest information mapping the first unique identifier to the particular seat location;
   based on a determination that the user operating the first passenger device is the passenger that was assigned to the particular seat location of the seatback device, automatically causing, by a personalization platform, at least a portion of an account data for the user to be displayed at the seatback device; and
   further based on the determination that the user operating the first passenger device is the passenger that was assigned to the particular seat location of the seatback device, cause concurrent playback of (i) an audio portion of a multimedia content at the first passenger device and (ii) a video portion of the multimedia content at the seatback device via a wireless pairing between the first passenger device and the seatback device.

2. The method of claim 1, further comprising:

identifying a second passenger corresponding to the seatback device; and responsive to a user selection of a second passenger device that is wirelessly connected with the seatback device, storing, by the account management module, an indication of a second unique identifier associated with the second passenger device with a second account data for the second passenger.

3. The method of claim 2, further comprising:

causing presentation of a list of candidate passenger devices, wherein the user selection of the second passenger device is detected via the presented list of candidate passenger devices.

4. The method of claim 2, further comprising:

transmitting the second account data with the indication of the second unique identifier to a ground server located outside of the commercial passenger airplane.

5. The method of claim 4, wherein the transmitting is configured to cause a version of the second account data stored at the ground server to be updated to include the indication of the second unique identifier.

6. The method of claim 1, further comprising:

receiving, from a ground server located outside of the commercial passenger airplane, the manifest information.

7. The method of claim 1, wherein the multimedia content is personalized to the passenger assigned to the seatback device according to the manifest information.

8. The method of claim 7, wherein the multimedia content includes content previously presented to the passenger prior to the passenger being onboard the commercial passenger airplane.

9. The method of claim 1, wherein the first unique identifier that is associated with the first passenger device is a media access control (MAC) address associated with the first passenger device.

10. The method of claim 1, wherein the first passenger device is an audio device that is configured to provide audio content to the passenger based on being wirelessly connected to the seatback device.

11. A seatback system of a commercial passenger airplane, the seatback system comprising a processor configured to execute operations to cause the seatback system to:

obtain a unique identifier associated with a first passenger device that is located within the commercial passenger airplane and wirelessly paired with a seatback device of a plurality of seatback devices corresponding to a plurality of seat locations within the commercial passenger airplane;

reference manifest information that respectively maps a plurality of passengers to the plurality of seat locations within the commercial passenger airplane, to determine whether a user operating the first passenger device is a passenger that was assigned to a particular seat location of the seatback device based on the manifest information mapping the unique identifier to the particular seat location;

based on a determination that the user operating the first passenger device is the passenger that was assigned to the particular seat location of the seatback device, automatically present account-specific data for display at the seatback device to the passenger; and further based on the determination that the user operating the first passenger device is the passenger that was assigned to the particular seat location of the seatback device, cause concurrent playback of (i) an audio portion of a multimedia content at the first passenger device and (ii) a video portion of the multimedia content at the seatback device via a wireless pairing between the first passenger device and the seatback device.

12. The seatback system of claim 11, wherein the processor is configured to execute the operations to further cause the seatback system to, responsive to a user selection of the first passenger device from a list of candidate device that is presented for display at the seatback system, store the unique identifier with an account data for the passenger.

13. The seatback system of claim 11, wherein the first passenger device is an audio device that is configured to provide audio content to the passenger based on being wirelessly connected to the seatback system.

14. The seatback system of claim 11, wherein the processor is configured to execute operations to further cause the seatback system to perform:

identifying a second passenger corresponding to the seatback device; and responsive to a user selection of a second passenger device that is wirelessly connected with the seatback device, storing an indication of a second unique identifier associated with the second passenger device with a second account data for the second passenger.

15. The seatback system of claim 14, wherein the processor is configured to execute operations to further cause the seatback system to perform:

causing presentation of a list of candidate passenger devices, wherein the user selection of the second passenger device is detected via the presented list of candidate passenger devices.

16. The seatback system of claim 14, wherein the processor is configured to execute operations to further cause the seatback system to perform:

transmitting the second account data with the indication of the second unique identifier to a ground server located outside of the commercial passenger airplane.

17. The seatback system of claim 16, wherein the transmitting is configured to cause a version of the second account data stored at the ground server to be updated to include the indication of the second unique identifier.

18. The seatback system of claim 14, wherein the processor is configured to execute operations to further cause the seatback system to perform:

receiving, from a ground server located outside of the commercial passenger airplane, the manifest information.

19. The seatback system of claim 11, wherein the multimedia content is personalized to the passenger assigned to the seatback device according to the manifest information.

20. The seatback system of claim 11, wherein the unique identifier that is associated with the first passenger device is a media access control (MAC) address associated with the first passenger device.

* * * * *